US012698408B2

(12) United States Patent
Yang et al.

(10) Patent No.: US 12,698,408 B2
(45) Date of Patent: Aug. 4, 2026

(54) PRE-TREATMENT COMPOSITION FOR INKJET PRINTING

(71) Applicant: Agfa NV, Mortsel (BE)

(72) Inventors: Bingyu Yang, Mortsel (BE); Jens Lenaerts, Mortsel (BE); Hubertus Van Aert, Mortsel (BE)

(73) Assignee: Agfa NV, Mortsel (BE)

( * ) Notice: Subject to any disclaimer, the term of this patent is extended or adjusted under 35 U.S.C. 154(b) by 322 days.

(21) Appl. No.: 18/579,994

(22) PCT Filed: Jul. 13, 2022

(86) PCT No.: PCT/EP2022/069549

§ 371 (c)(1),
(2) Date: Jan. 17, 2024

(87) PCT Pub. No.: WO2023/001650

PCT Pub. Date: Jan. 26, 2023

(65) Prior Publication Data

US 2024/0336799 A1 Oct. 10, 2024

(30) Foreign Application Priority Data

Jul. 19, 2021 (EP) .................................... 21186280

(51) Int. Cl.

*C09D 11/54* (2014.01)
*B41J 2/01* (2006.01)

(Continued)

(52) U.S. Cl.

CPC ................. *C09D 11/54* (2013.01); *B41J 2/01* (2013.01); *B41J 2/2107* (2013.01); *B41J 2/2114* (2013.01);

(Continued)

(58) Field of Classification Search

CPC ... B41J 2/01; B41J 2/211; B41J 2/1433; B41J 2/17; B41J 2/17593; B41J 2/2107;

(Continued)

(56) References Cited

U.S. PATENT DOCUMENTS

| | | | | |
|---|---|---|---|---|
| 2012/0140009 A1* | 6/2012 | Kanasugi | B41J 2/0057 | 347/103 |
| 2013/0293647 A1* | 11/2013 | Dannhauser | B41M 5/502 | 524/436 |

(Continued)

FOREIGN PATENT DOCUMENTS

| | | | |
|---|---|---|---|
| CN | 111565936 A | 8/2020 |
| WO | WO 2015/177891 A1 | 4/2017 |

(Continued)

OTHER PUBLICATIONS

European Patent Office, International Search Report in International Patent Application No. PCT/EP2022/069549, mailed Sep. 15, 2022, 3 pp.

(Continued)

*Primary Examiner* — Manish S Shah

(74) *Attorney, Agent, or Firm* — Leydig, Voit & Mayer, Ltd.

(57) ABSTRACT

A pre-treatment composition for inkjet printing, comprising water, a water-soluble multi-valent metallic salt, a wax, a non-ionic dispersant and a resin particle, the resin particle is stabilized by a non-ionic group or non-ionic or amphiphilic compound. A fluid set comprising the pre-treatment composition and an aqueous inkjet ink is suitable for printing liners for corrugated packaging, folding boards or a corrugated card boards.

20 Claims, 1 Drawing Sheet

Pattern used for inkjet printing during the evaluation of the image quality and physical properties of images obtained with pre-treatment compositions.

(51) Int. Cl.

| | |
|---|---|
| ***B41J 2/21*** | (2006.01) |
| ***B41M 5/00*** | (2006.01) |
| ***B41M 7/00*** | (2006.01) |
| ***C09D 11/32*** | (2014.01) |
| ***C09D 11/322*** | (2014.01) |

(52) U.S. Cl.
CPC ........ *B41M 5/0017* (2013.01); *B41M 5/0047* (2013.01); *B41M 7/009* (2013.01); *C09D 11/322* (2013.01); *C09D 11/32* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2014/0113114 | A1* | 4/2014 | Kasperchik .......... | C09D 11/322<br>977/773 |
| 2014/0212591 | A1* | 7/2014 | Swei ...................... | C09D 11/30<br>524/548 |
| 2014/0308447 | A1* | 10/2014 | Sarkisian ............. | C09D 11/322<br>427/261 |
| 2015/0217576 | A1* | 8/2015 | Yatake ................... | C09D 11/40<br>347/21 |
| 2015/0352877 | A1 | 12/2015 | Niu et al. | |
| 2019/0100871 | A1* | 4/2019 | Taga .................... | C09D 11/322 |
| 2019/0127601 | A1 | 5/2019 | Toles et al. | |
| 2020/0115580 | A1 | 4/2020 | Moriyama et al. | |
| 2020/0317944 | A1 | 10/2020 | Fukagawa et al. | |
| 2021/0079245 | A1* | 3/2021 | Li ........................ | C09D 11/326 |
| 2021/0122545 | A1 | 4/2021 | Toles et al. | |
| 2023/0030249 | A1 | 2/2023 | Sugihara et al. | |

FOREIGN PATENT DOCUMENTS

| | | | |
|---|---|---|---|
| WO | WO 2018/017089 | A1 | 1/2018 |
| WO | WO 2019/013785 | A1 | 1/2019 |
| WO | WO 2021/117517 | A1 | 6/2021 |

OTHER PUBLICATIONS

European Patent Office, Written Opinion in International Patent Application No. PCT/EP2022/069549, mailed Sep. 15, 2022, 4 pp.

* cited by examiner

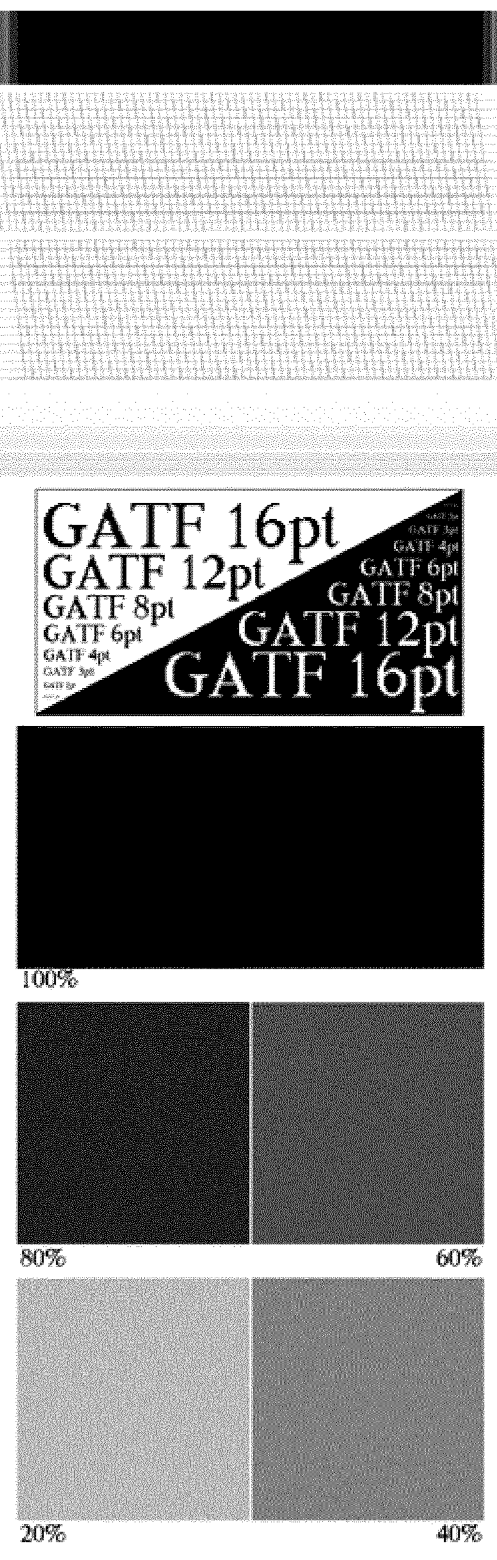
Pattern used for inkjet printing during the evaluation of the image quality and physical properties of images obtained with pre-treatment compositions.

PRE-TREATMENT COMPOSITION FOR INKJET PRINTING

CROSS-REFERENCE TO RELATED APPLICATIONS

This patent application is the U.S. national stage of copending International Patent Application No. PCT/EP2022/069549, filed Jul. 13, 2022, which claims the benefit of European Patent Application No. 21186280.0, filed Jul. 19, 2021.

TECHNICAL FIELD

The invention relates to pre-coat compositions suitable for inkjet recording, more specifically inkjet printing on liners for corrugated packaging, folding boards and corrugated card boards.

BACKGROUND ART

Nowadays, there is a growing area of digital pre-printing of liners for corrugated packaging and corrugated card boards. The pre-printing of primers or pre-coats improves the image quality of the image which is printed upon the pre-coat. The possibility to apply a pre-coat, only of the parts which will carry the image, makes it possible to reduce consumption of the pre-coat.

Inkjet printing is a growing area of printing of liners for corrugated packaging and of corrugated card boards. In printing of liners for corrugated card boards, usually flexographic printing or offset printing is performed for applying a pre-coat or primer.

In order to obtain high quality images, the pre-coat is a composition capable of receiving ink and holding colorants in the ink to a greater degree than a substrate not treated with a pre-coat. In particular, the pre-coat is capable of holding colorants at or near the surface of a substrate so that optical density and colour gamut of the printed image may be improved compared to a porous substrate that is not treated with the pre-coat.

WO 2018/017089 describes a sprayable pre-coat for corrugated linerboard or containerboard packaging as packaging material. The pre-coat composition contains a polyvalent metal salt, a wax, a dispersing agent, a latex and water. The latex includes monomers such as styrene, 1,3-butadiene, acrylonitrile or combinations thereof. The ability to fix colour pigments to the substrate is still moderate leading to an easy rubbing off the image from the substrate.

WO2019/013785 describes a treatment composition for a packaging liner including a fixing agent, a wax, and a latex. The latex is stabilized by means of anionic groups, for example originating from carboxylic groups. Image quality of images obtained by aqueous inks jetted onto the treatment composition still suffer from mottling and bad ink spreading of the aqueous inks resulting in an inhomogeneous colour density in the solid areas of the printed images.

There is still a need for a pre-treatment composition leading to acceptable image quality of the inkjet printed images and showing an increased resistance against rubbing off the image from the liner surface.

SUMMARY OF INVENTION

It is the objective of the present invention to provide a solution to the above stated problems. The objective has been achieved by providing a pre-treatment composition as defined in claim 1.

It is another embodiment of the invention to provide a fluid set containing an aqueous inkjet ink and a pre-treatment composition of claim 1 as defined in Claim 7

It is another embodiment of the invention to provide a printing method using the pre-treatment composition of claim 1 as defined in Claim 9.

Other features, elements, steps, characteristics and advantages of the present invention will become more apparent from the following detailed description of preferred embodiments of the present invention. Specific embodiments of the invention are also defined in the dependent claims. embodiments of the invention are also defined in the dependent claims.

BRIEF DESCRIPTION OF THE FIGURES

FIG. 1.: Pattern used for inkjet printing during the evaluation of the image quality and physical properties of images obtained with pre-treatment compositions. The pattern contains solid areas and negative text with different size ranging from 1 pt to 16 pt.

DESCRIPTION OF EMBODIMENTS

A. Fluid Set Comprising a Pre-Treatment Composition and Aqueous Inkjet Ink

A.1. Pre-Treatment Composition

A.1.1. Resin Particle

The pre-treatment composition according to the invention, comprises a resin particle which is dispersed in the aqueous medium of the composition. The resin is selected from the group consisting of poly(urethanes) and copolymers thereof, acrylics and copolymers thereof, poly(esters) and copolymers thereof, poly(styrenes) and copolymers thereof, poly(vinyl amides) and copolymers thereof, poly (vinyl alcohol) derivatives and copolymers thereof, poly (acetals) and copolymers thereof, poly(ethers) and copolymers thereof, poly(vinyl ethers) and copolymers thereof, polyvinyl (esters) and copolymers thereof, poly(imides) and copolymers thereof, poly(imines) and copolymers thereof, polycarbonates and copolymers thereof, poly(vinyl chloride) and copolymers thereof, poly(vinylidene chloride) and copolymers thereof, poly(amic acids) and copolymers thereof, poly(saccharides) and derivatives thereof and cellulose and derivatives thereof. The resin particle is stabilized by a non-ionic group or a non-ionic or amphiphilic compound. Non-ionic groups are to be understood as a groups which are covalently linked to the resin particle.

In order to be compatible with fixing agents in the pre-treatment composition such as multivalent metal salts or cationic polymers, the resin particle is preferably non-ionic and sterically stabilized.

This steric stabilization such as to obtain an aqueous resin particle dispersion is preferably obtained by covalently attaching an oligomeric or polymeric group to the resin particle. Non-ionic surfactants may also provide a non-ionic stabilised resin particle dispersion. If the surfactant is not immobilized to the resin particle, a more inferior water resistance is obtained. Therefor the resin particle dispersions are preferably stabilized by non-ionic water soluble groups or polymer segments which are covalently attached to the resin particle.

The resin particle dispersion can be prepared in different ways, e.g. emulsion copolymerization for acrylic copolymers, solvent process and subsequent high shear dispersing method for polyurethane dispersion synthesis, Perutz dispersion technique (e.g. dissolving polymer in a water immiscible solvent such as ethyl acetate, dispersing the polymer solution in water and evaporation of water-immiscible solvent).

For poly(urethane) dispersions, a non-ionic stabilization can be accomplished by use of polyether diols in the preparation of the poly(urethane) resin. The polyether diol preferably used in the present invention, is Ymer N180, Ymer N120, Ymer N90 or Tegomer D 3403, i.e. α-[2,2-bis(hydroxymethyl)butyl]-ω-methoxy-Poly(oxy-1,2-ethanediyl). These diols can be prepared from trimethylol propane oxetane (TMPO). A possible synthesis procedure is described by Fock, J.; Möhring, V., Polyether-1,2- and -1,3-diols as macromonomers for the synthesis of graft copolymers, 1. Synthesis and characterization of the macromonomers. Die Makromolekulare Chemie 1990, 191 (12), 3045-3057. In general, also other polyether 1,2- or 1,3-diols can be used.

The advantage of using polyether 1,2- or 1,3-diols is that such polyether side chains give additional steric stabilization. α,ω-bis hydroxyl terminated polyalkylene oxides can also be used but are more difficult to orient themselves towards the water phase as compared to diols where both hydroxyl groups are on one side of the polyether and a graft copolymer is formed upon copolymerization.

Mono-hydroxyl terminated polyethers can also be used, but provide a block copolymer upon copolymerization. In general, graft copolymers are preferred for obtaining steric stabilization with polyalkylene oxide chains. The polyalkylene oxide segments have preferably a high ethylene glycol content to provide water solubility, in particular when the pre-treatment composition contains a large water content.

The diols with tradename Ymer from the company Perstorp are based on ethylene oxide and will provide a good water solubility. These diol telomers are suitable building blocks for polycondensation polymerisations and preparation of polyurethanes, polyesters or polycarbonates having a polyether graft.

For addition polymerization, e.g. preparation of polyacrylates, mono-methacrylate or mono-acrylate terminated polyethers can be used for the preparation of graft copolymers with polyether side chains. Examples of suitable macromers for addition polymerisations are polyethylene glycol monomethacrylate (CAS registry number 25736-86-1), polyethylene glycol monoacrylate (CAS registry number 26403-58-7), polyethylene glycol monomethyl ether monomethacrylate (CAS registry number 26915-72-0), Polyethylene glycol methyl ether acrylate (CAS registry number 32171-39-4), monomethoxypolyethylene glycol monoglycidyl methacrylate (CAS registry number 152952-46-0), α-[2-hydroxy-3-[(1-oxo-2-propenyl)oxy]propyl]-ω-methoxy-poly(oxy-1,2-ethanediyl) (52656-37-8), α-(3-carboxy-1-oxo-2-propen-1-yl)-ω-methoxy-poly(oxy-1,2-ethanediyl) (cas registry number 62884-81-50 or α,α'-(1,4-dioxo-2-butene-1,4-diyl)bis[ω-methoxy-poly(oxy-1,2-ethanediyl) (CAS registry number 164659-91-0).

Monofunctional oxirane functional polyethers are also suitable to make polymers with polyether grafts via ring-opening polymerization or use in polymer modification reactions such as: polyethylene glycol monoglycidyl ether (CAS registry number 27252-81-90) or α-[(3-methyl-3-oxetanyl)methyl]-ω-hydroxy-poly(oxy-1,2-ethanediyl) (CAS registry number 84032-51-9).

The polyether graft copolymer can also be obtained via reaction of an amine terminated polyether. Glycidyl or maleic anhydride functional polymers could give upon reaction with an amine terminated polyether a suitable graft copolymer. Typical amino terminated polyethers, e.g. Aminopoly(ethylene glycol) methyl ether (CAS registry number 80506-64-5), Polyethylene glycol 2-aminoethyl ether (CAS registry number 32130-27-1)

Non-ionic stabilization of resin particles can also be achieved by means of incorporation of polysaccharide or sugar derivatives, such as 2-[(2-methyl-1-oxo-2-propen-1-yl)oxy]ethyl D-mannopyranoside (casr registry number 132153-56-1) or α-D-glucopyranosyl 6-O-[2-[(2-methyl-1-oxo-2-propen-1-yl)oxy]ethyl]-α-D-glucopyranoside (CAS registry 1448612-64-3).

Steric stabilization can further be obtained by adding a non-ionic or amphiphilic compound such as hydrophilic polymers such as polyvinyl alcohol copolymers, cellulose derivatives, dextrin derivatives or other polysaccharides. Such stabilization if well-known for polymer dispersions or emulsions based on vinylacetate copolymers or homopolymers.

A preferred resin particle dispersion incorporated in the pre-treatment composition according the invention, is based on polyurethane particle dispersions. In the polyurethane synthesis one can implement different polyols for obtaining suitable physical, mechanical or optical properties, such as adhesion towards the substrate used, water resistance, solvent resistance, weather resistance, scratch resistance, gloss or opacity, etc. . . . Regularly used polyols are: polyether polyols, polyester polyols, polycarbonate polyols, polyamide polyol, polyacrylate polyols and polyolefine polyols. Besides the polymeric polyols also low molar mass diols can be used and diols which could have affinity for the aqueous phase such as dimethylol propionic acid. In order to get a good compatibility with multivalent salts the use of water soluble polyether diols is preferred.

By reacting the different polyols with a diisocyanate, modified isocyanate or polyisocyanate, the required polyurethane resin (PU) can be obtained. Suitable diisocyanates are: isophorone diisocyanate (IPDI), 4,4'-dicyclohexylmethane diisocyanate (H12MDI), 2,4,4'-trimethyl-1,6-hexamethylene diisocyanate (TMDI), hexamethylene diisocyanate (HMDI), pentamethylene diisocyanate (PDI), tolylene diisocyanate (TDI), xylene diisocyanate (XDI) and diphenylmethane diisocyanate (MDI). Usually such PU is prepared in an organic solvent such as acetone or MEK, dispersed in water by addition of water under high shear and subsequent evaporation of the organic solvent.

The amount of the resin particle in the pre-coat composition is between 1 wt. %, and 50 wt. %, preferably between 5 wt. % and 45 wt. %, more preferably between 20 wt. % and 40 wt. % with respect to the total solids content of the pre-coat composition. An amount exceeding these values has a negative effect on the jetting reliability of the pre-coat composition if it is applied via a jetting technique.

Suitable commercial available PU dispersions are eg. Vondic 2220, Vondic 1980NE supplied by Toyobo, Printrite DP375 and Printrite PD379 supplied by Lubrizol, Esacote PU3511 supplied by Lamberti, Neorez R9340 available from DSM and 2019WTT001-3 available from BASF.

A.1.2. Non-Ionic Dispersant

The pre-treatment composition of the invention further includes a non-ionic dispersant, preferably a non-ionic polymeric dispersing agent.

Suitable non-ionic dispersants are polymeric dispersing agents, non-ionic surfactants and segmented polymers, such as graft-, block-, star-branched, comb- or gradient copolymers. These polymeric dispersing agents are preferably amphiphilic structures having at least one segment which is soluble, dispersable or compatible in water based media. The medium is not necessarily only water but can also be a mixture with other solvents. In water based inkjet inks, other water-soluble solvents can be added such as propylene glycol, glycerol, dipropylene glycol monomethyl ether, 2-hydroxyethyl pyrolidone. At least one segment or part of the polymeric dispersing agent should be compatible with the solvent medium of the ink.

Examples of suitable non-ionic surfactants as non-ionic dispersants are: alkyl ethoxylates, alkylaryl ethoxylates, alkyl alkoxylates based on ethylene oxide, butylene oxide and/or propylene oxide copolymers, tristyryl alkoxylates, alkylphenol alkoxylates. Most regular alkoxylated surfactants prepared using different alkylene oxide units are based on EO (ethylene oxide) and PO (propylene oxide), but can also be based on ethylene oxide and butylene oxide (BO) or ethylene oxide and styrene oxide (SO). The hydrophilicity of the hydrophilic segment can be changed by variation of the number of EO units but instead of EO also other hydrophilic alkylene oxide units can be used such as based on glycidol, other oxiranes, glycerol, glucitol, glucoside, ect. Typical trade names are Lutensol (BASF), Plurafac (BASF), Lucramul (Levaco Chemicals), Tergitol (Dow), Etocas (Croda), Pionin (NOF), Emulsogen (Clariant), Silco sperse (Keim Additec)

The hydrophobic part in the non-ionic surfactant can be based on an alkyl, aryl or alkylaryl group but can also be based on a more hydrophobic based polymer segment, such as polyethers like polypropylene oxide, polybutylene oxide, polyesters like polycaprolactone, polyacrylate (e.g. PMMA), polystyrene, polyvinyl ester, polyvinyl ether, polyurethane, polyurea, polyamide.

Suitable polymeric dispersants are amphiphilic dispersing agents having polymeric or oligomeric hydrophobic segments. They are also referred as segmented copolymers. Typical examples are diblock or triblock copolymers based on EO and PO. Typical trade names are Pluronic RPE grades or Pluronic PE grades, available via BASF and Synperonic grades from Croda. In case of triblock copolymers, the outer blocks have a different polarity than the mid-block. The most polar blocks can be located at the outside but also be located in the middle as the mid-block. Besides diblock and triblock copolymers also multiblock copolymers can be used.

Particularly preferred are copolymers based on EO and PO having an average molecular weight between 3000 g/mol and 10000 g/mol, more preferably between 4000 g/mol and 8500 g/mol and having a PPO/PEO weight ratio between 0.3 and 2.5. Pre-coat compositions having copolymers with these molecular weight range and PPO/PEO weight ratio perform even better regarding storage stability and image quality. The average Mw (average molar mass) is determined from the OH number (mgKOH/g) obtained by titration e.g., using method ISO 4326.

The non-ionic dispersant is present in the pre-treatment composition in an amount ranging from greater than 0 wt. % to 40 wt. %, based on the total dry solids content of the treatment composition, more preferably in an amount ranging from 2 wt. % to 35 wt. %, based on the total dry solids content of the treatment composition, most preferably in an amount ranging from 5 wt. % to 30 wt. % based on the total dry solids content of the treatment composition.

The non-ionic dispersant is preferably selected from the group consisting of a tri-alkylaryl polyethylene glycol alkylacrylate, and a polydimethylsiloxane-co-polyethylene glycol methacrylate. In another aspect of the invention, the dispersing agent can be a block co-polymer based dispersant.

A suitable non-ionic dispersant includes SILCO SPERSE™ HLD-6 available from Silcona GmbH 8 Co., KG (Stromberg, Germany). SILCO SPERSE™ HLD-6 is a non-ionic yellowish, polymeric dispersant with groups of high pigment affinity.

A.1.3. Wax

The pre-treatment composition according to the invention comprises a wax. The wax may improve the ink durability during corrugation. Generally, any suitable wax may be used in the pre-treatment composition. As such, the wax may be polyethylene waxes, petroleum waxes, paraffin waxes, carnauba waxes, polypropylene waxes, crystalline and microcrystalline waxes, amide waxes (oleamide, stearamide, erucamide, cyclic amide, etc. . . . ), and combinations thereof. In an aspect of the invention, the wax may be a high density polyethylene wax. In another aspect, the wax may be a micronized polypropylene wax, for example Mju:Wax 4810 available from Cerona GmbH.

In an aspect of the invention, the wax may be a polyethylene wax or modified paraffin wax. An example of polyethylene wax includes high density polyethylene (HDPE) wax, which has a density ranging from about 0.93 g/mL to about 0.97 g/mL. The density of HDPE is generally higher than the density of low density polyethylene (LDPE) due, at least in part, to a smaller amount of molecular branching in HDPE. An example of modified paraffin wax particles includes paraffin wax that has been modified to improve solubility in water, e.g., via emulsification. The modified paraffin wax may be surface modified, chemically modified, etc. Some specific examples of wax that may be used include those of the JONCRYL Wax series (such as JONCRYL Wax 22, JONCRYL Wax 26, and JONCRYL Wax 120 available from BASF Corp.), those of the AQUACER series (such as AQUACER 498, AQUACER 501, AQUACER 505, AQUACER 513, AQUACER 530, AQUACER 531, AQUACER 535, AQUACER 537, AQUACER 539, and AQUACER 552 available from BYK-Gardner, Columbia, Md.) and Liquilube 404E from Lubrizol. The wax may also or otherwise be chosen from water-dispersed wax available from Micro Powders, Inc., Tarrytown, N. Y.

The wax may have i) a high melting temperature T and/or ii) a small average particle size. In an example, the wax may have a high T such as one that is equal to or greater than about 100° C. In an example, the T of the wax may range from about 100° C. to about 150° C. In another example, the T of the wax may range from about 110° C. to about 135° C. Further, the wax may have an average particle size (in terms of effective diameter assuming that the individual wax particles are not perfectly spherical) ranging from 0.03 μm to 15 μm. In another example, the wax particles may have an average particle size of 0.05 μm to 10 μm, more preferably from 0.09 μm to 0.50 μm (D50). The particle size of the wax may be measured by various techniques, such as dynamic light scattering. If the particle size exceeds these upper limits, jetting reliability problems of the pre-coat composition are likely to occur.

The wax may be present in the pre-treatment composition in an amount ranging from 5 to 25 wt. %, more preferably from 10 to 20 wt. %, relative to the total solids weight of the pre-treatment composition.

A.1.4. Fixing Agent

The fixing agent present in the pre-treatment composition is preferably a multivalent metal salt or a cationic polymer.

The polyvalent metal salt may be present in the pre-treatment composition to improve inkjet print quality. Generally, the polyvalent metal salt may be any water-soluble polyvalent metal salt. In specific examples, the polyvalent metal salt may include calcium chloride ($CaCl_2$), magnesium chloride ($MgCl_2$), magnesium sulfate ($MgSO_4$), aluminium chloride ($AlCl_3$), calcium nitrate ($Ca(NO_3)_2$), magnesium nitrate ($Mg(NO_3)_2$), magnesium acetate ($Mg(CH_3COO)_2$), zinc acetate ($Zn(CH_3COO)_2$) calcium propionate ($Ca(C2H_5COO)_2$), or a combination thereof. In a particular example, the polyvalent metal salt may be calcium chloride. In further examples, the polyvalent metal salt may include a metal cation selected from calcium, copper, nickel, magnesium, zinc, barium, iron, aluminium, chromium, or another polyvalent metal.

The polyvalent metal salt may also include an anion. In some examples, the anion may be fluoride, chloride, iodide, bromide, nitrate, chlorate, sulfate, acetate, or $RCOO^-$ where R is hydrogen or any low molecular weight hydrocarbon chain, e.g., C1 to C12. In a more specific example, the anion may be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. The cationic salt may also be a mixture of two or more different cationic salts In some cases, the polyvalent metal salt may be present in an amount from 1 wt. % to 99 wt. % with respect to the entire weight of the pre-treatment composition. In more specific examples, the polyvalent metal salt may be present in an amount from 5 wt. % to 65 wt. %, more preferably from 25 wt. % to 60 wt. %, with respect to solids content of the pre-treatment composition. If the amounts are below the lower limits, insufficient fixing of the colorants occur resulting in a reduced image quality.

Polymeric cationic polymers, suitable as fixing agent in the pre-treatment composition contain either guanidinium or fully quaternized ammonium functionalities, such as quaternized polyamine copolymers. Generally, the weight average molecular weight (Mw) of the cationic polymer allows viscosity less than 25 cP at 25° C., as measured on a Brookfield viscometer. Typical Mw are less than 500.000, and in one aspect, less than 50.000.

Suitable classes of cationic polymers that can be used include, but are not limited to, quaternized polyamines, dicyandiamide polycations, diallyldimethyl ammonium chloride copolymers, quaternized dimethylaminoethyl (meth)acrylate polymers, quaternized vinylimidizol polymers, alkyl guanidine polymers, alkoxylated polyethylene imines, and mixtures thereof.

A.1.5. Vehicle

The aqueous pre-treatment composition according to the invention comprises water as a vehicle. The aqueous vehicle may include one or more water-soluble organic solvents.

The one or more organic solvents may be added for a variety of reasons. For example, it can be advantageous to add a small amount of an organic solvent to improve the dissolution of a compound in the pre-treatment composition to be prepared, to obtain better penetration in porous substrates or to prevent fast drying of the pre-treatment composition at the nozzle of the inkjet head. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), N-hydroxyethyl-pyrrolidon, N-butyl-pyrrolidon, amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides such as N,N-dimethylformamide, heterocycles such as 2-pyrrolidone and N-methyl-2-pyrrolidone, and acetonitrile. The humectant is preferably added to the pre-coat composition formulation in an amount of 0.1 to 25 wt. % based on the total weight of the liquid.

A.1.6. Additives

The pre-treatment composition may contain a surfactant. Any known surfactant may be used but preferably a glycol surfactant and/or an acetylene alcohol surfactant and/or a polysiloxane surfactant is used. The use of the acetylene glycol surfactant and/or the acetylene alcohol surfactant and/or the polysiloxane surfactant improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available from Nissin Chemical Industry, for example, as Olfine (registered trademark) E series, such as Olfine E1010, or from Evonik (formerly Air Products (GB)) as Surfynol (registered trademark), 104, Surfynol 465 and Surfynol 61.

A biocide may be added to the pre-coat composition to prevent unwanted microbial growth, which may occur over time. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the total weight of the liquid.

The pre-coat composition may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly (acrylic acid), poly(vinyl alcohol), partially hydrolyzed poly (vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride).

The thickener is added preferably in an amount of 0.01 to 20 wt. %, more preferably 0.1 to 10 wt. % based on the liquid.

The pre-coat composition may also contain an optothermal converting agent, which may be any suitable compound absorbing in the wavelength range of emission by an infrared light source. The optothermal converting agent is preferably an infrared dye as this allows easy handling into the liquid. Suitable examples of infrared dyes are disclosed in [0179] of WO2015158649.

The one or more optothermal converting agents are preferably present in the range of 0.1 to 10 wt. % based on the total weight of the liquid.

The pre-coat composition may also contain pigments. Particularly useful for printing on dark or transparent substrates, is a pre-coat composition containing a white pigment. The preferred pigment for the aqueous pre-coat composition ink is titanium dioxide. Titanium dioxide ($TIO_2$) pigment useful in the present invention may be in the rutile or anastase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-coat composition. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with multivalent metal salt in the pre-treatment composition of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

The pre-coat composition may contain at least one pH adjuster. Suitable pH adjusters include organic amines such as triethanolamine, NaOH, KOH, $NEt_3$, $NH_3$, HCl, $HNO_3$ and $H_2SO_4$. In a preferred embodiment, the pre-coat composition has a pH equal to or lower than 9.

A2. Aqueous Inkjet Ink

The aqueous inkjet ink which is used to print upon the areas where the pre-treatment composition has been applied to obtain a printed image, comprises colorants such as dyes and pigments. The pigments are preferably stabilized by anionic dispersing groups. The pigments can also be additionally stabilised by polymeric dispersants, surfactants or a combination thereof to achieve extra colloidal stability. The aqueous medium contains water, but may include one or more water-soluble organic solvents. Suitable organic solvents are described in § A.1.5.

In a preferred embodiment of the invention, the aqueous inkjet ink comprises a resin and or a wax. Suitable waxes are described in § A.1.3.

The aqueous inkjet ink may further comprise a surfactant, a humectant, a biocide, a resin and a thickener as an additive. These suitable additives are described in § A.1.6.

A.2.1. Pigment

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

The pigment particles are dispersed in an aqueous medium using a polymeric dispersant, a surfactant or a combination thereof. Self-dispersible pigments can also be used. The latter prevents interaction of the polymeric dispersant with the dispersing groups of binders or capsules which may be included in the inkjet ink (see below).

A self-dispersible pigment is a pigment having on its surface covalently bonded anionic hydrophilic groups or salt-forming groups, that allow the pigment to be dispersed in an aqueous medium without using a surfactant or a resin.

The technology for making self-dispersible pigments is well-known. For example, EP1220879A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300

μm and particularly preferably between 0.080 and 0.200 μm. Most preferably, the numeric average pigment particle size is no larger than 0.150 μm. The average particle size of pigment particles is determined with a Brookhaven Instruments Particle Sizer B190plus based upon the principle of dynamic light scattering. However, for white pigment inkjet inks, the numeric average particle diameter of the white pigment is the same as described in § A.1.6.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants are copolymers of two monomers but they may contain three, four, five or even more monomers. The properties of polymeric dispersants depend on both the nature of the monomers and their distribution in the polymer. Co-polymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock,N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 15%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

A.2.2. Resin

The ink jet ink composition according to the invention may comprise a resin suspension. The resin is often added to the ink jet ink formulation to achieve a good adhesion of the pigment to the substrate. The resin is a polymer and suitable resins can be acrylic based resins, a urethane-modified polyester resin or a wax.

The polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin to be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 wt. % and preferably lower than 30 wt. %, more preferably lower than 20 wt. %.

The ink jet ink composition according to the invention may comprise a capsule. Capsules, more preferably nanocapsules are often incorporated in ink jet ink formulations to encapsulate colouring agents (US2009227711A, JP2004075759) or to encapsulate reactive ingredients which can crosslink. Particularly useful are the nanocapsules disclosed in WO2015158649 [0037-0110]: The nanocapsules have a polymeric shell surrounding a core containing reactive chemistry. The shell material includes polyureas, polyurethanes, polyesters, polycarbonates, polyamides, melamine based polymers and mixtures thereof, with polyureas and polyurethanes being especially preferred. Other particularly useful nanocapsules are disclosed in WO2016165970 [0051-0138]: the nanocapsules are selfdispersable and include a dispersing group covalently coupled to the shell polymers. The core of the nanocapsules in WO2015158649 [0037-0110] and WO2016165970 [0051-0138] comprise reactive chemistry which is able to form a reaction product upon application of heat and/or light, allowing a wide variety of substrates to be addressed. Other suitable reactive chemistry is the one which is activated upon radiation as described in WO2015158649 [0068-0110].

The nanocapsules are preferably present in the inkjet ink in an amount of no more than 30 wt. %, preferably between 5 and 25 wt. % based on the total weight of the ink.

B. Inkjet Recording Method

B.1. Application Method of the Pre-Treatment Composition

The pre-treatment composition according to the present invention is suitable for treating different substrates, porous and non-porous ones. Porous substrates include paper, card board, white lined chipboard, corrugated board, packaging board, folding board, wood, ceramics, stone, leather and textile. Non-porous substrates include metal, glass, polypropylene, polyvinylchloride, PET, PMMA, polycarbonate, polyamide, polystyrene or co-polymers thereof.

The pre-treatment composition is particularly suited for being jetted onto papers intended for packaging applications. The papers can be a single layer of a multilayer paper.

The paper may be brown Kraft, White Top or bleached board. The paper may be manufactured from chemical, wood, or recycled fibre. As an example, the paper may be a liner intended for printing on page wide web presses and converted into corrugated boxes. In this aspect, the liner paper may be used as a double face liner and may be converted directly in a corrugator or laminated onto a double face liner after corrugation. The paper may also be boards used for boxes and other packaging applications.

All well-known conventional methods can be used for coating or impregnating the pre-treatment composition on a substrate. Examples of the method include air knife coating, blade coating, roll coating, gravure coating and spraying. More preferably the pre-treatment composition is applied by means of a jetting technique.

The pre-treatment composition is then applied using an ink jet head or valve jet head. This means of applying the pre-treatment composition, which is preferably according to an image, has the advantage that the amount of required pre-treatment composition is substantially lower than with the other application methods. By means of a jetting head, it is possible to apply the pre-treatment composition onto areas of the substrate where the image should be printed. Suitable ink jet head types for applying the pre-treatment composition are piezoelectric type, continuous type, thermal print head type, Memjet-type or valve jet type.

After applying the pre-treatment composition onto a substrate, the coating is preferably at least partially dried before printing the image onto the treated substrate.

Substrates to which the pre-treatment composition has been applied may be dried and optionally undergo a heat treatment, before the subsequent ink jetting step with the colorant containing ink. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the pre-treatment composition, is not substantially dried before the image is printed by means of the jetting of the aqueous ink jetting step.

B.2. Ink Jetting & Drying

After the application of the pre-treatment composition to the substrate, the aqueous inkjet ink according to the invention is applied to the substrate, preferably onto the parts where the pre-treatment composition has been applied on. The inkjet ink comprises a colorant, more preferably a pigment. A preferred method of applying the aqueous inkjet ink is by means of an ink jetting technique.

A preferred inkjet head for the jetting of the pre-treatment composition printing system is a piezoelectric inkjet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with pre-treatment composition. When the voltage is again removed, the ceramic expands to its original shape, ejecting a drop of pre-treatment composition from the inkjet head. However, the jetting of the pre-treatment composition according to the present invention is not restricted to piezoelectric inkjet printing. Other inkjet print heads can be used and include various types, such as a continuous type, a thermal print head type, a Memjet-type of head and a valve jet type.

C. Examples

C.1. Materials

All materials used in the following examples were readily available from standard sources such as Aldrich Chemical Co. (Belgium) and Acros (Belgium) unless otherwise specified. Where used, water is demineralised water.

PB15:3 is Hostapermm B4G-KR, a C.I. Pigment Blue 15:3 pigment from CLARIANT.

Edaplan is an abbreviation used for Edaplanm 482, a polymeric dispersant from MUNZING CHEMIE GmbH.

Proxel is a 5 wt. % aqueous solution of 1,2-benzisothiazolin-3-one available as Proxel™ K from YDS CHEMICALS NV.

Liquilube 404E is a 35 wt. % aqueous HDPE wax dispersion from Lubrizol

Surfynol 104PG50 is a 50 wt. % solution of 2,4,7,9-Tetramethyl-5-decyne-4,7-diol in propylene glycol from Evonik Printrite DP379 is an aqueous 30 wt. % dispersion of a polyether based polyurethane from Lubrizol Styron HPX94 is 54 wt. % aqueous dispersion of a poly(styrene butadiene) from Styron Europe Aquacer 530 is an aqueous dispersion containing 32 wt. % oxidized HDPE wax from BYK Aquacer 531 is an aqueous dispersion containing 45 wt. % modified PE wax from BYK Synperonic PE P105 is a PEO/PPO co-polymeric dispersant having an average Mw of 6500 g/mol and a PPO/PEO weight ratio of approximately 1.00 from Croda Tergitol 15-S-15 is a 100% secondary alcohol ethoxylate dispersing agent from Dow Emulsogen TS200 is a 100% tristyrylphenol-polyglycolether dispersant from Clariant Pluronic L44 is a 100% PEO/PPO co-polymeric dispersant having an average Mw of 2200 g/mol and a PPO/PEO weight ratio of approximately 1.50 from BASF Pluronic F68 is a 100% PEO/PPO co-polymeric dispersant having an average Mw of 8750 g/mol and an PPO/PEO weight ratio of approximately 0.25 from BASF Kauropal K933 is a non-ionic oxirane, mono(2-propylheptyl) ether from BASF Tego Foamex 822 is a polyether siloxan copolymer from Evonik C.2. Evaluation Methods C.2.1. Image Quality The pre-treatment compositions were applied onto a coated corrugated liner XLHD MM X-Liner HD (180 g/m$^2$) from MM Karton using a 4 μm spiral bar. The coated liner was dried at 60° C. in an oven for 2 minutes.

After drying the pre-treatment compositions, the coated liner was printed by means of an ImageXpert JetXpert with GIS print head driving electronics for FujiFilm Dimatix Samba print head (Samba G3L) with a drop volume between 5.4-6.5 pl at a voltage between 19.5-23.5 V at 32° C. and with a firing frequency of 7.8 kHz using aqueous cyan ink. The printed images were dried at 60° C. for 2 minutes in an oven. The pattern of the print is shown in FIG. 1.

The image quality of the print was evaluated by visually analysing the following three properties: 1) ink spreading; 2) ink fixing and 3) image sharpness.

Ink spreading: the ink should completely cover the solids in the printed image. A lack of ink spreading is demonstrated by the appearance of white lines in the solid areas. The evaluation was conducted by visually observing the solid areas and by giving a score from 0 (excellent ink spreading, complete coverage) to 3 (poor ink spreading, more than 20 white lines visible in the solid area).

Ink fixing: the ink should homogenously and intensely cover the solids in the printed image. A lack of ink fixing is demonstrated by the appearance of uneven patterns in the solid areas. The ink fixing was evaluated by visually observing the solid areas and by giving a score from 0 (excellent ink fixing, homogeneous coverage) to 3 (poor ink fixing, strong unevenness observable).

Image sharpness: the fine texts of should be readable. A lack of image sharpness is demonstrated by the disappearance of negative text. The image sharpness was evaluated by visually observing the negative texts and by giving a score from 0 (excellent image sharpness, 6 pt clearly readable) to 3 (poor image sharpness, 16 pt partially or totally covered by ink).

C.2.2. Water Resistance

The water resistance of the prints was evaluated by measuring the CIELAB ΔE after the water resistance tests.

The water resistance was evaluated by rubbing the solid areas with a wetted cotton swab, 10 double strokes. The ΔE of the image was calculated by comparing the CIELAB E values of the solid areas of the printed image before and after the wet rub.

The evaluation of the water resistance is according to the criteria as shown in Table 1. A good pre-treatment composition should provide acceptable levels of water resistance.

TABLE 1

| Scoring | Water resistance |
|---|---|
| 0 (Excellent) | ΔE < 10 |
| 1 (Good) | 10 ≤ ΔE < 20 |
| 2 (Moderate) | 20 ≤ ΔE < 40 |
| 3 (Poor) | ΔE >= 40 |

C.3. Preparation of Pre-Treatment Compositions

The pre-treatment compositions were prepared by mixing the ingredients given in Table 2. The weight percentages are relative to the total weight of the pre-treatment compositions. The raw materials were used as supplied without any further treatments.

TABLE 2

| | Amount in wt. % | | | |
|---|---|---|---|---|
| Compound | COMP-PC | INV-PC1 | INV-PC2 | INV-PC3 |
| Styron HPX94 | 9.91 | — | — | — |
| Printrite DP379 | — | 17.78 | 17.78 | 17.78 |
| Mg(NO3)2•6H2O | 11.25 | 11.25 | 11.25 | 11.25 |
| Kauropal K933 | 0.04 | 0.04 | 0.04 | 0.04 |
| Tego Foamex 822 | 0.04 | 0.04 | 0.04 | 0.04 |
| Aquacer 530 | 8.0 | 8.0 | 8.0 | 8.0 |
| Synperonic PE P105 | 1.0 | 1.0 | — | — |
| Tergitol 15-S-15 | — | — | 5.0 | — |
| Emulsogen TS200 | — | — | — | 5.0 |
| Propylene glycol | 18.0 | 18.0 | 18.0 | 18.0 |
| 1,2-hexanediol | 2.85 | 2.85 | 2.85 | 2.85 |
| D.I. water | To complete to 100% | To complete to 100% | To complete to 100% | To complete to 100% |

White opaque liquids were obtained. All the above mentioned pre-coat compositions showed good storage stability showing stable particle size distribution after 1 week aging at 60° C.

Pre-coat compositions comprising PPO/PEO co-polymers were prepared by mixing the ingredients given in Table 3. The weight percentages are relative to the total weight of the pre-treatment compositions. The raw materials were used as supplied without any further treatments.

TABLE 3

| | Amount in wt. % | | | |
|---|---|---|---|---|
| Compound | INV-PC4 | INV-PC5 | INV-PC6 | INV-PC7 |
| Printrite DP379 | 17.78 | 17.78 | 17.78 | 17.78 |
| Mg(NO3)2.6H2O | 11.25 | 11.25 | 11.25 | 11.25 |
| Kauropal K933 | 0.04 | 0.04 | 0.04 | 0.04 |
| Tego Foamex 822 | 0.04 | 0.04 | 0.04 | 0.04 |
| Aquacer 531 | 5.0 | 5.0 | 5.0 | 5.0 |
| Synperonic PE P105 | 1.0 | — | 5.0 | — |
| Pluronic L44 | — | 1.0 | — | — |
| Pluronic F68 | — | — | — | 5.0 |
| Propylene glycol | 18.0 | 18.0 | — | — |
| 1,2-hexanediol | 2.85 | 2.85 | — | — |
| D.I. water | To complete to 100% | To complete to 100% | To complete to 100% | To complete to 100% |

White opaque liquids were obtained. All the above mentioned pre-coat compositions showed good storage stability showing stable particle size distribution after 1 week aging at 60° C.

C.4. Preparation of Aqueous Inkjet Ink

In a first step, a concentrated aqueous pigment dispersion was made by mixing the pigment PB15:3, with the dispersant Edaplan using a Disperlux™ Yellow mixer and milled using a Dynomill™ KDL with 0.04 mm yttrium stabilized zirconium beads YTZ™ Grinding Media (available from TOSOH Corp.). After milling, the dispersion is separated from the beads. The concentrated aqueous pigment dispersion served as the basis for the preparation of the inkjet inks.

An aqueous cyan ink was prepared by diluting the corresponding concentrated pigment dispersion with the other ink ingredients according to Table 4 expressed in wt. % based on the total weight of the ink. Water was added to complete the ink to the desired pigment concentration.

TABLE 4

| Component | Amount (wt. %) |
|---|---|
| PB15:3 | 3.0 |
| Edaplan | 1.5 |
| Proxel | 0.2 |
| 1,2-hexanediol | 3.00 |
| Surfynol 104PG50 | 0.4 |
| Propylene glycol | 36.00 |
| Liquilube 404 E | 2.86 |
| Water | 53.04 |

The performance of different pre-treatment compositions is listed in Table 5 and in Table 6.

TABLE 5

| Pre-treat comp. | No primer | COMP-PC | INV-PC1 | INV-PC2 | INV-PC3 |
|---|---|---|---|---|---|
| Ink spreading | 1 | 2 | 0 | 0 | 1 |
| Ink fixing | 3 | 3 | 0 | 0 | 0 |
| Image sharpness | 0 | 0 | 0 | 0 | 0 |
| Water resistance | 0 | 2 | 2 | 1 | 2 |

It can be seen from Table 5, that pre-coat compositions combining a polyether based polyurethane resin particle dispersion, a wax, a multivalent salt and a non-ionic dispersant, do improve image quality significantly in terms of ink spreading and ink fixing. The physical properties of the print showed no negative effects with respect to the comparative.

TABLE 6

| Primer liquid | INV-PC4 | INV-PC5 | INV-PC6 | INV-PC7 |
|---|---|---|---|---|
| Ink spreading | 0 | 1 | 0 | 1 |
| Ink fixing | 0 | 0 | 0 | 0 |
| Image sharpness | 0 | 0 | 0 | 0 |

From Table 6 it can be seen that if the pre-treatment composition comprises a PPO/PEO block co-polymer having a Mw between 4000 g/mol and 8500 g/mol together with a PPO/PEO weight ratio between 0.3 and 2.5, an even better image quality is obtained than with PPO/PEO block copolymers outside this range.

The invention claimed is:

1. A pre-treatment composition for inkjet printing, comprising water, a water-soluble multi-valent metallic salt, a wax, a non-ionic dispersant and a resin particle, wherein the resin is selected from the group consisting of poly(urethanes) and copolymers thereof, acrylics and copolymers thereof, poly(esters) and copolymers thereof, poly(styrenes) and copolymers thereof, poly (vinyl amides) and copolymers thereof, poly (vinyl alcohol) derivatives and copolymers thereof, poly (acetals) and copolymers thereof, poly(ethers) and copolymers thereof, poly(vinyl ethers) and copolymers thereof, polyvinyl(esters) and copolymers thereof, poly (imides) and copolymers thereof, poly(imines) and copolymers thereof, polycarbonates and copolymers thereof, poly(vinyl chloride) and copolymers thereof, poly (vinylidene chloride) and copolymers thereof poly (amic acids) and copolymers thereof, poly(saccharides) and derivatives thereof, and cellulose and derivatives thereof, and wherein the resin particle is stabilized by a non-ionic group or a non-ionic or amphiphilic compound, and wherein the non-ionic dispersant is a PPO/PEO copolymer, an arylethylphenyl polyglycolether, or a fatty acid derivative with EO/PO moieties.

2. The pre-treatment composition of claim 1, wherein the non-ionic group is selected from the group consisting of a polyethylene glycol graft, a cellulose, a dextran, a sugar derivative, and a grafted polyvinylalcohol.

3. The pre-treatment composition of claim 1, wherein the non-ionic or amphiphilic compound is selected from the group consisting of polyvinyl alcohol copolymers, cellulose derivatives, dextrin derivatives, polysaccharide derivatives, and cyclodextrin.

4. The pre-treatment composition of claim 2, wherein the non-ionic or amphiphilic compound is selected from the group consisting of polyvinyl alcohol copolymers, cellulose derivatives, dextrin derivatives, polysaccharide derivatives, and cyclodextrin.

5. The pre-treatment composition of claim 1, wherein the non-ionic dispersant is a PPO/PEO copolymer having an average Mw from 4000 g/mol to 8500 g/mol and a PPO/PEO weight ratio from 0.3 to 3.0.

6. The pre-treatment composition of claim 2, wherein the non-ionic dispersant is a PPO/PEO copolymer having an average Mw from 4000 g/mol to 8500 g/mol and a PPO/PEO weight ratio from 0.3 to 3.0.

7. The pre-treatment composition of claim 1, further comprising a pigment.

8. A fluid set comprising the aqueous pre-treatment composition as defined in claim 1 and an aqueous ink, the aqueous ink comprising a colorant.

9. A fluid set comprising the aqueous pre-treatment composition as defined in claim 2 and an aqueous ink, the aqueous ink comprising a colorant.

10. A fluid set comprising the aqueous pre-treatment composition as defined in claim 5 and an aqueous ink, the aqueous ink comprising a colorant.

11. The fluid set of claim 8, wherein the aqueous ink comprises a resin selected from the group consisting of an acrylic based resin, a urethane based resin, and a wax.

12. The fluid set of claim 9, wherein the aqueous ink comprises a resin selected from the group consisting of an acrylic based resin, a urethane based resin, and a wax.

13. The fluid set of claim 10, wherein the aqueous ink comprises a resin selected from the group consisting of an acrylic based resin, a urethane based resin and a wax.

14. A printing method comprising the steps of:

a) applying the pre-treatment composition as defined in claim 1 to a substrate;

b) jetting onto the applied pre-treatment composition an aqueous inkjet ink containing a colorant;

c) optionally at least partially dry the applied pre-treatment composition; and d) applying heat to dry the applied pre-treatment composition and the jetted aqueous inkjet ink.

15. The printing method of claim 14, wherein the pre-treatment composition is applied via a jetting technique.

16. The printing method of claim 14, wherein the substrate is a liner for corrugated packaging, a folding board, or a corrugated card board.

17. The printing method of claim 14, wherein the aqueous inkjet ink comprises a pigment as colorant and a wax.

18. A printed liner or corrugated card board obtained by the printing method as defined in claim 14.

19. A printing method comprising the steps of:

a) applying the pre-treatment composition as defined in claim 2 to a substrate;

b) jetting onto the applied pre-treatment composition an aqueous inkjet ink containing a colorant;

c) optionally at least partially dry the applied pre-treatment composition; and d) applying heat to dry the applied pre-treatment composition and the jetted aqueous inkjet ink.

20. A printing method comprising the steps of:

a) applying the pre-treatment composition as defined in claim 5 to a substrate;

b) jetting onto the applied pre-treatment composition an aqueous inkjet ink containing a colorant;

c) optionally at least partially dry the applied pre-treatment composition; and d) applying heat to dry the applied pre-treatment composition and the jetted aqueous inkjet ink.

* * * * *